May 16, 1944.　　　　E. ROTHEIM　　　　2,348,851
LIQUID SPRAYING APPARATUS
Filed April 15, 1941　　　　2 Sheets-Sheet 1
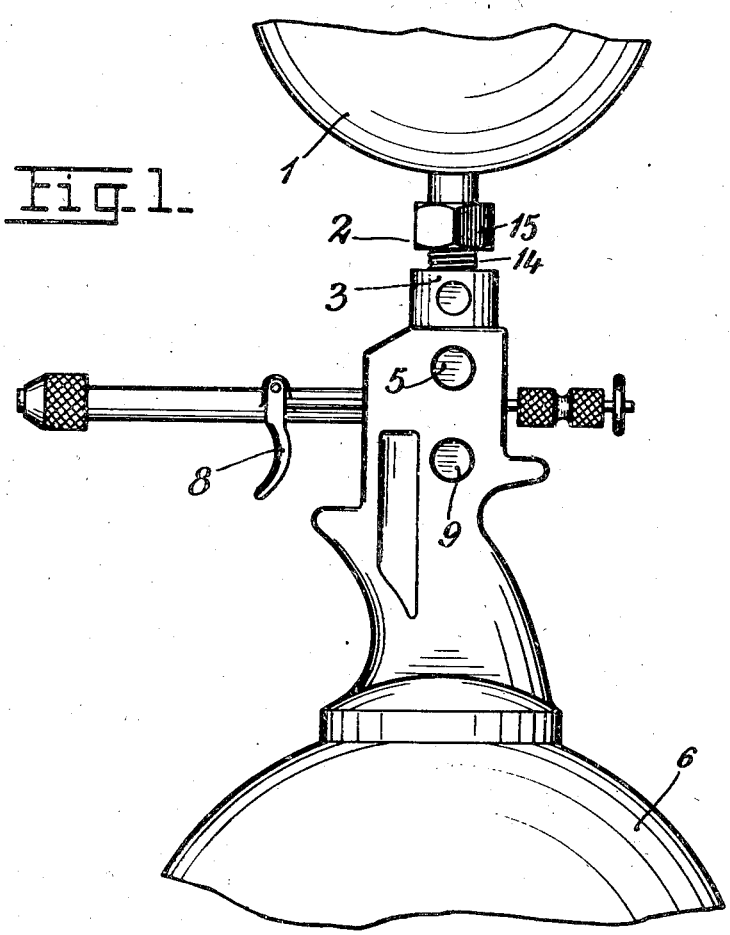
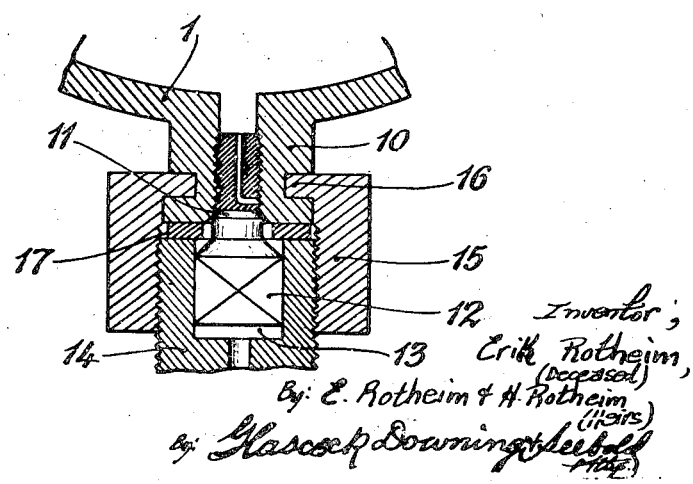

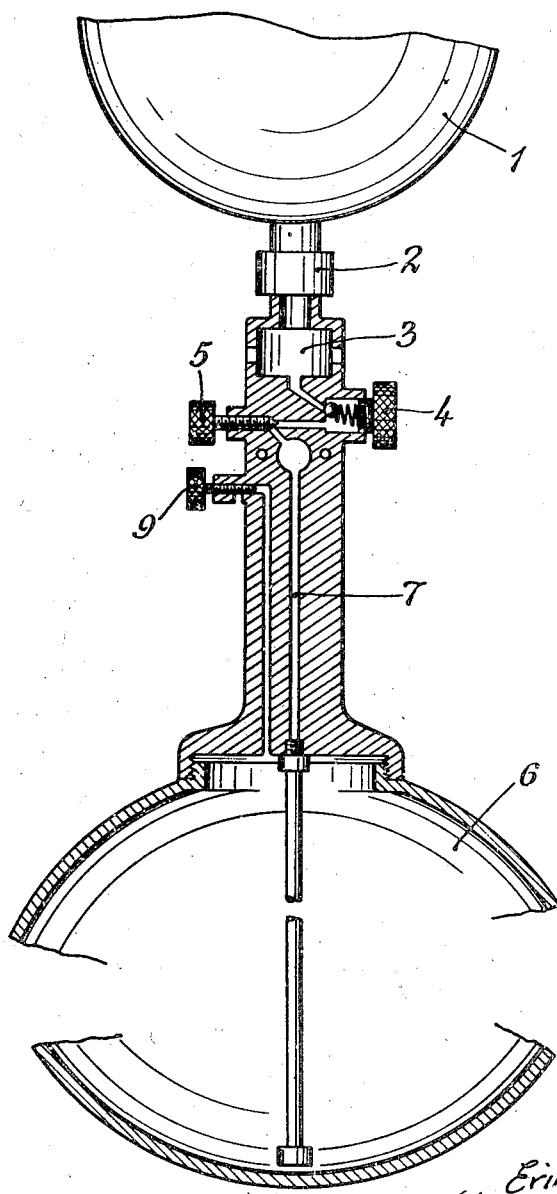

Patented May 16, 1944

2,348,851

UNITED STATES PATENT OFFICE 2,348,851

LIQUID SPRAYING APPARATUS

Erik Rotheim, deceased, late of Oslo, Norway; by Erica Rotheim and Hagbarth Rotheim, heirs, Oslo, Norway; vested in the Alien Property Custodian Application April 15, 1941, Serial No. 388,699
In Norway July 11, 1939

6 Claims. (Cl. 299—95)

The present invention relates to liquid spraying apparatus of the type in which the liquid, which is stored in a pressure container provided with an outlet member controllable by an operator, has dissolved therein a substance, which is gaseous at usual room temperature and pressure, and which serves as a means to expel the liquid from said container when the operator opens the outlet member. The apparatus of this type hitherto known are sold to the customers ready for use, and when the liquid content of the apparatus has been used up, the apparatus has either been thrown to waste, or it had to be returned to the manufacturer for renewed filling with a new charge of liquid having a gas dissolved therein. This means heavy expenses and, moreover, the manufacturer may be compelled to keep in stock ready filled apparatus containing several different types of liquid.

It is the object of the present invention to remove these drawbacks. To this end the substance to serve as expelling means is distributed by the manufacturer in individual pressure containers, comprising a special valve, and the spraying apparatus proper or the outlet member thereof is provided with an arrangement for establishing communication between the valve of said container and the liquid container of the spraying apparatus, so that pressure substance may be transferred into the latter and become dissolved in the liquid therein. Thus the manufacturer needs to keep in stock and distribute containers filled with pressure substance only, and the customer may himself, at the place of consumption, fill his spraying apparatus with the desired liquid and dissolve pressure agent therein, and returns solely the pressure substance containers to the manufacturer for refilling.

The invention therefore also covers a distributable pressure substance container for such use, and further covers also certain means for controlling the transfer of pressure substance from such container into the spraying apparatus.

The drawings illustrate by way of example an embodiment of apparatus according to the invention.

Figure 1 is a side view of the spraying apparatus connected to a pressure substance container, parts being broken away.

Figure 2 shows more or less diagrammatically a vertical section through the spraying apparatus in Figure 1, taken at right angles to the plane of the paper in Figure 1.

Figure 3 is a section illustrating a valve construction for the pressure substance container.

The spraying apparatus comprises a container 6 and a removable discharge arrangement provided thereon, which in the embodiment shown is in the general shape of a pistol. When charging the apparatus the pistol member is first unscrewed from the container 6, then the liquid to be sprayed is filled into said container 6, and the pistol member is again screwed thereon. Now the pressure agent in question, say propane, is introduced into the liquid in the container 6. Such pressure agent is delivered by the manufacturer in the form of liquified gas in containers 1, below called spheres. According to the invention now either the pistol member or the container 6 proper is provided with a device by means of which it may be brought into pressure-tight communication with the sphere 1. In the embodiment here illustrated the sphere 1 is brought in communication with the top of the pistol member by means of a valve device 2, which is shown more in detail in Figure 3 and will be fully described below.

When said communication has been established by means of the valve device 2 the latter one is opened and the pressure substance flows from the sphere 1 into the top portion of the pistol member. The latter is provided with a space 3 enclosing an indicator of suitable type (not shown) which indicates what quantity of pressure substance has passed through the same into the pistol member. Such indicator may for instance take the shape of a volume meter having a counting apparatus, the indications of which may be read through windows arranged in the walls of the chamber 3. However, the indicator might also consist of a manometer indicating the pressure which in each instant prevails in the container 6 and the pistol member.

From the space 3 the pressure agent flows through a non-return valve 4 and from there through a stop valve 5. The non-return valve 4 is not absolutely necessary, but has in some cases proved to be suitable. From the stop valve 5 extends a channel 7 through the pistol member, and in communication with said channel 7 is a tube which extends to near the bottom of the container 6. The pistol proper, through the nozzle of which the liquid with pressure agent dissolved therein shall later be sprayed, is of course closed to the atmosphere during the introduction of pressure agent into the container 6. The closing means necessary for that purpose are suitably arranged in the front part of the pistol. Thus, by means of the valves and communications described above the desired quantity of pressure agent is introduced into the container, where it dissolves in the liquid. Then the valves 5 and 2 are closed, and if desired the pressure agent sphere 1 may be removed. The spraying apparatus now is ready for use. A pull exerted on the trigger 8 of the pistol member opens the communication between the container 6 and the nozzle of the pistol, and the liquid is pressed out either as a spray or as a fine jet, according to the height of the pressure and the type of nozzle used. During this operation the liquid is flowing upwards through the same channel 7 which was used for the introduction of pressure agent.

As above mentioned the channel 7 communicates with a tube extending practically to the bottom of the container 6. According to a feature of the invention said tube may consist of flexible material and is at its free end provided with a weight, so that the weighted end of the tube will always be positioned at the lowermost part of the suitably spherical container 6, even if the apparatus is kept in inclined position when in use.

Figure 3 shows on a larger scale a vertical section through an embodiment of the valve and connection device which in Figures 1 and 2 is generally designated by the numeral 2. Into a projection 10 on the sphere 1 is screwed a valve member 12 having a conical valve shoulder 11 cooperating with a corresponding conical valve seat on the extension 10. The screw threaded part of the member 12 has a longitudinal central boring which closely over the shoulder 11 communicates with a radial narrow boring. The head of the valve member 12 is unround, for instance square, and fits into a corresponding shaped space 13 in the top part 14 of the pistol member. Said part 14 is externally provided with screw threads and cooperates with a nut 15 having pins or an annular flange 16 extending into a circular groove on the extension 10. Between the ends of the extension 10 and the part 14 is provided a stuffing disc 17, which if desired may be secured to the valve head 12, so that it always accompanies the sphere 1.

When the pressure agent is to be transferred from the sphere 1 the valve 12 is inserted into the space 13. Then the nut 15 is screwed on to the threads of the part 14 and thereby presses the extension 10 and the part 14 with the stuffing disc 17 therebetween against each other, so that gas tight connection is obtained. Then the operator turns the sphere a few turns backwards, so that the shoulder of the valve no longer rests tightly against the valve seat. The pressure agent therefore penetrates through the borings of the valve, past the valve seat and into the space 13, and from there to the container 6 as described above. Turning of the sphere 1 in the opposite direction again closes the valve 12, and then the connection between the sphere 1 and the pistol member may again be broken off. In order to make the turning of the sphere 1 more easy the latter may be externally corrugated or knurled.

The described valve device is also suitable for charging of the sphere with pressure agent in manufacturers plant. The part 14 then comprises a branch tube on a main for pressure agent, but as for the rest the filling operation is, as will be understood, quite analogous to that described above.

In some cases it may be desirable to provide a special pressure releasing valve for the container 6. In the embodiment here illustrated is shown such a valve 9 arranged in the pistol member and communicating with the top of the container through a bore in the pistol member.

What is claimed is:

1. In combination a container for liquid under fluid pressure, a spraying device having a conduit in communication therewith, a pressure fluid inlet stud on said spraying device having a passage communicating with said conduit, said passage terminating in a non-cylindrical recess, a second container for pressure fluid having an opening, a valve threaded in said opening, an unround head on said valve fitting into said recess, said second container and stud having means for pressing the same rigidly together and operable upon turning relatively to each other to open said valve thereby establishing communication between said containers.

2. An apparatus according to claim 1 having a stop valve in the communication means between said stud and the container for liquid.

3. An apparatus according to claim 1 comprising a non-return valve in the communication means between said stud and the container for liquid.

4. In a liquid spraying device, the combination of a container for liquid under pressure; a conduit communicating with said container; a spraying means connected with said conduit; a container for pressure fluid; an outlet conduit for said second container; means adapted to connect said conduits so that they are relatively rotatable and secured against relative axial displacement, with a leak-proof joint; and valve means adapted to be actuated by the relative rotation of the two conduits, to open and close communication between said conduits.

5. In a device for coupling fluid conduits, the combination of a conduit; a collar threaded on the end of said conduit and having an inner peripheral flange; a second conduit having an annular groove on its outer surface in which said flange is slidably received; and a valve member non-rotatably, slidably mounted in said first mentioned conduit and having a shank threaded into the end of said second mentioned conduit and adapted to seat and unseat the valve member relative to the end of said second mentioned conduit when the second mentioned conduit is rotated relative to said shank, said shank having a bore adapted to connect said conduits when the valve member is unseated.

6. In a device for coupling fluid conduits, the combination of a conduit having a valve seat formed on the inner perimeter of its end; a valve having a shank threaded in said conduit, and adapted to be seated on and unseated from said seat by rotation of the conduit relative to the shank, and having a head; a second conduit having a recess in its end in which said head is non-rotatably received; and a collar rotatably mounted on and immovable axially of said first mentioned conduit, and threaded on for axial displacement relative to said second mentioned conduit, adapted to connect said conduits in a leak-proof joint, said shank having a bore providing communication between said conduits when they have been connected by said collar and the valve is unseated.

ERICA ROTHEIM.
HAGBARTH ROTHEIM.
*Heirs of the Estate of Erik Rotheim, Deceased.*